United States Patent
Wakazono et al.

(10) Patent No.: US 8,950,250 B2
(45) Date of Patent: Feb. 10, 2015

(54) LOADING DEVICE FOR TIRE TESTING MACHINE

(75) Inventors: Takehiko Wakazono, Takasago (JP); Glen Thompson, Hudson, OH (US)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/002,460

(22) PCT Filed: Mar. 12, 2012

(86) PCT No.: PCT/JP2012/001702
§ 371 (c)(1),
(2), (4) Date: Aug. 30, 2013

(87) PCT Pub. No.: WO2012/137416
PCT Pub. Date: Oct. 11, 2012

(65) Prior Publication Data
US 2013/0333615 A1    Dec. 19, 2013

(30) Foreign Application Priority Data

Apr. 7, 2011  (JP) ................................ 2011-085604

(51) Int. Cl.
*G01M 17/02*   (2006.01)
*B65G 37/00*   (2006.01)
(52) U.S. Cl.
CPC ............. *B65G 37/00* (2013.01); *G01M 17/021* (2013.01)
USPC ........................................................ 73/146
(58) Field of Classification Search
None
See application file for complete search history.

(56) References Cited

U.S. PATENT DOCUMENTS

| 4,638,756 | A | 1/1987 | Collmann |
| 6,082,191 | A | 7/2000 | Neiferd et al. |
| 7,240,543 | B2 * | 7/2007 | Cargould et al. ............... 73/146 |
| 2013/0036810 | A1 * | 2/2013 | Wollbrinck et al. ............ 73/146 |

(Continued)

FOREIGN PATENT DOCUMENTS

| JP | 63 295242 | 12/1988 |
| JP | 4 71674 | 3/1992 |

(Continued)

OTHER PUBLICATIONS

Extended European Search Report issued Aug. 12, 2014 in Patent Application No. 12767772.2.

(Continued)

*Primary Examiner* — Andre Allen
(74) *Attorney, Agent, or Firm* — Oblon, Spivak, McClelland, Maier & Neustadt, L.L.P.

(57) ABSTRACT

Provided is a loading device that is provided in a tire testing machine including a testing station (30) provided with a spindle (31) attached with a tire (50) to be tested and feeds the tire (50) from a predetermined standby position to a testing position where the center of the spindle matches the center of the tire (50) in the testing station (30). The loading device includes: conveyors (1, 2) that convey the tire (50) from the standby position toward the testing position in a direction perpendicular to the axial direction of the tire; and positioning devices (6B, 20) that position the tire to be tested to a position, in which a front end of the tire in the feeding direction matches a point separated from the spindle by a predetermined distance, as the standby position. Setting of the standby position based on the position of the front end of the tire (50) in the feeding direction shortens the feeding distance and the feeding time and hence shortens the testing cycle time.

11 Claims, 9 Drawing Sheets

(56) References Cited

U.S. PATENT DOCUMENTS

| | | | |
|---|---|---|---|
| 2013/0205883 A1* | 8/2013 | Symens et al. | 73/146 |
| 2013/0233066 A1* | 9/2013 | Wakazono et al. | 73/146 |
| 2013/0298656 A1* | 11/2013 | Symens et al. | 73/146 |
| 2013/0298657 A1* | 11/2013 | Stanoszek et al. | 73/146 |
| 2014/0250996 A1* | 9/2014 | Wakazono et al. | 73/146 |
| 2014/0260583 A1* | 9/2014 | Vernyi et al. | 73/146 |

FOREIGN PATENT DOCUMENTS

| | | |
|---|---|---|
| JP | 04-295706 A | 10/1992 |
| JP | 2001 511891 | 8/2001 |
| JP | 2006 23151 | 1/2006 |
| JP | 2007 279057 | 10/2007 |
| WO | WO 98/35213 A2 | 8/1998 |
| WO | WO 98/35213 A3 | 8/1998 |

OTHER PUBLICATIONS

Written Opinion of the International Searching Authority Issued May 1, 2012 in PCT/JP12/001702 Filed Mar. 12, 2012.

International Search Report Issued May 1, 2012 in PCT/JP12/01702 Filed Mar. 12, 2012.

* cited by examiner

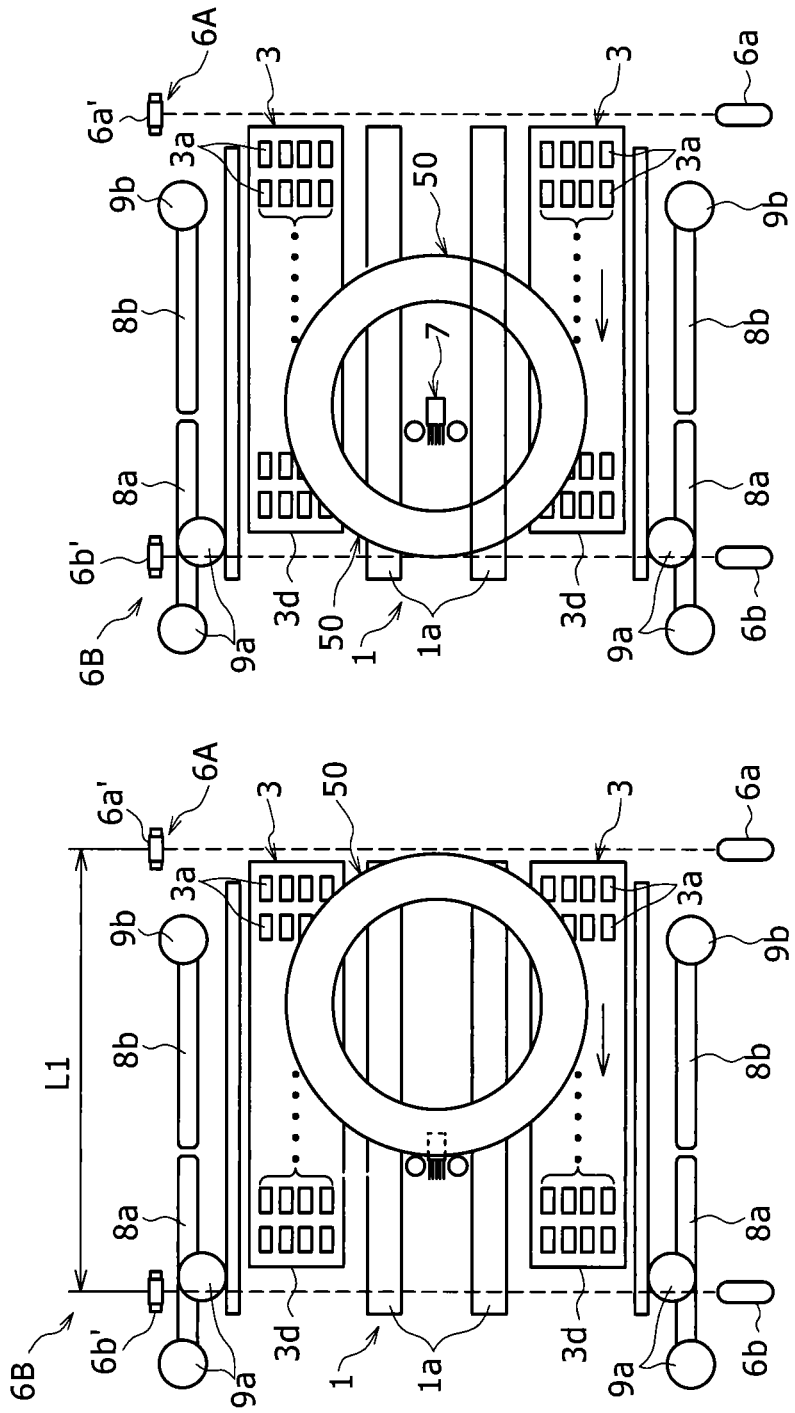

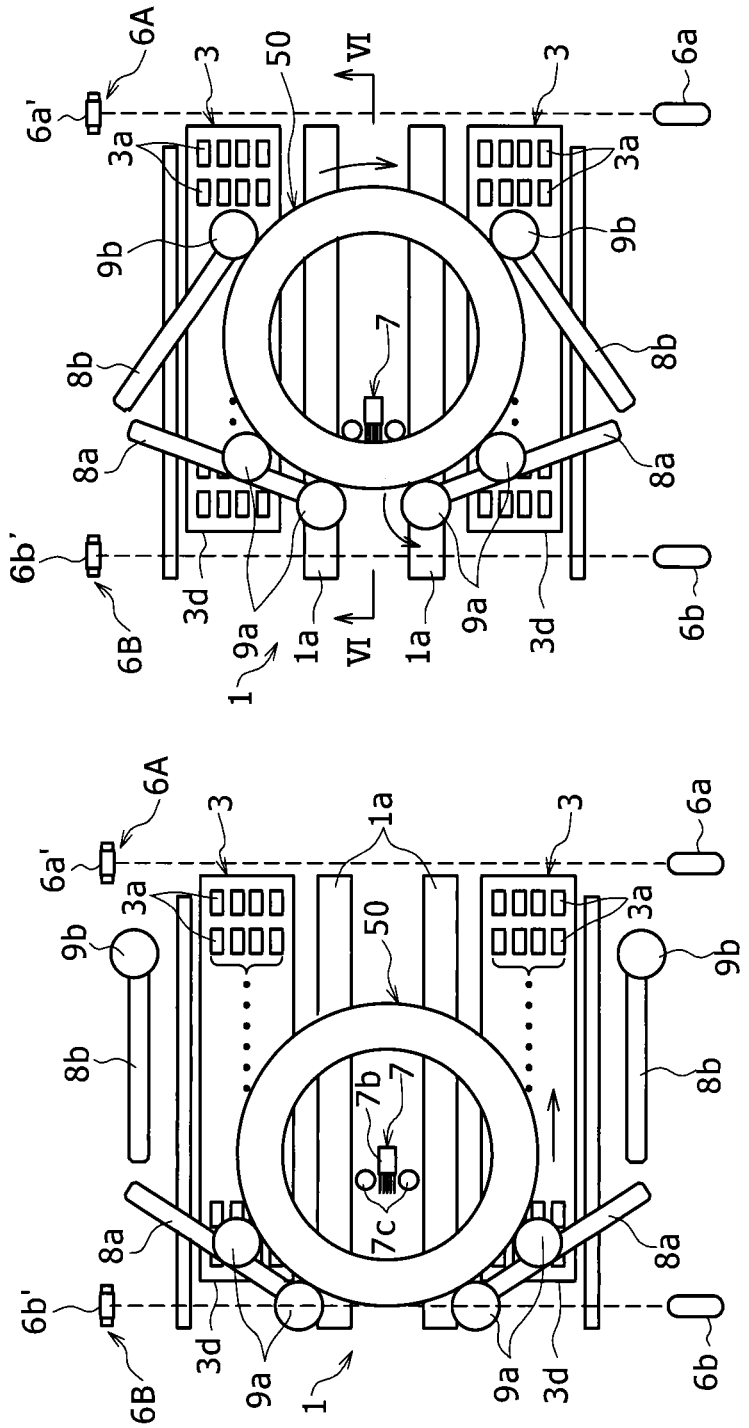

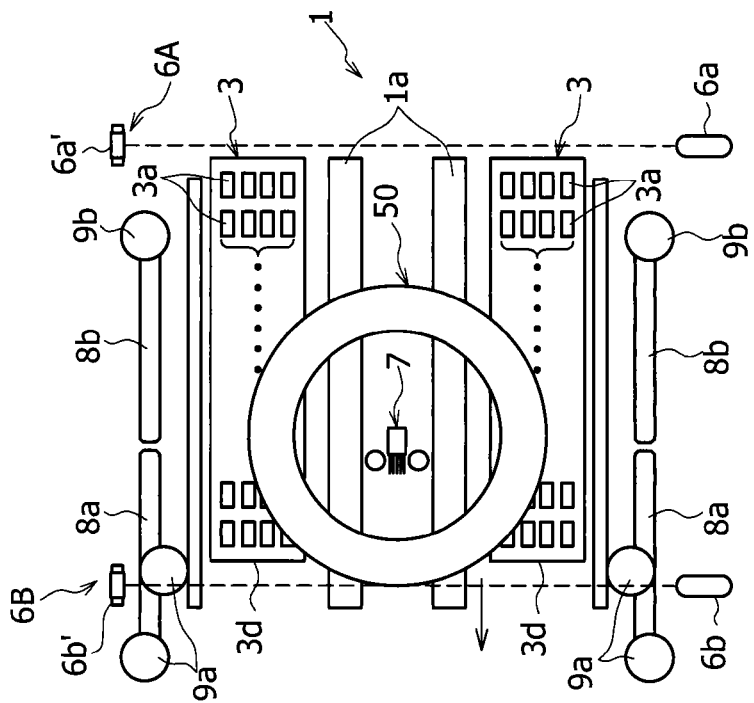
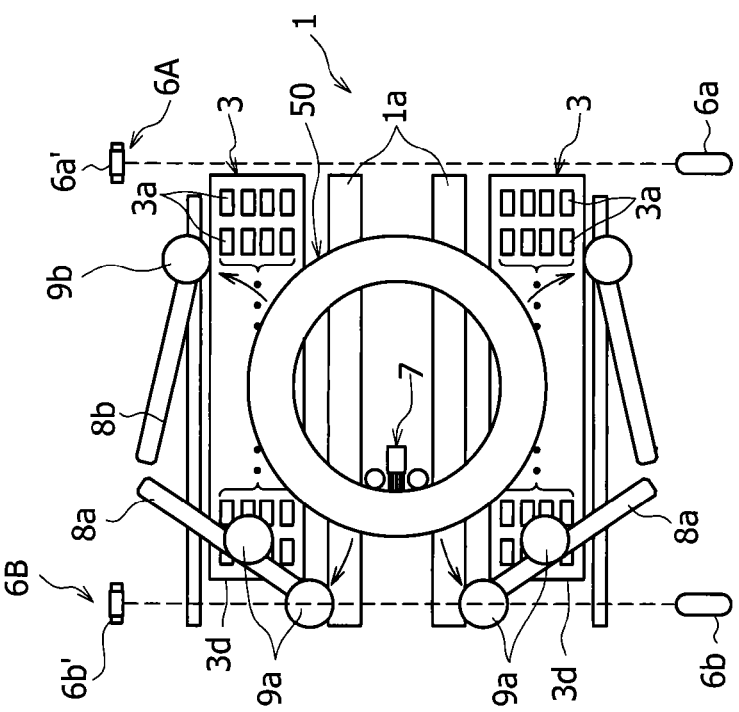

LOADING DEVICE FOR TIRE TESTING MACHINE

TECHNICAL FIELD

The present invention relates to a loading device for a tire testing machine that is provided in a tire testing machine so as to feed a tire to a testing station thereof.

BACKGROUND ART

When a tire attached to an automobile has an elastic modulus, a dimension, or a shape which is not constant in the circumferential direction thereof, the tire generates a vibration in a high-speed rotation state and hence degrades a running performance. For this reason, an examination is performed by a tire testing machine so as to determine whether a vulcanized and patterned tire is uniform in the circumferential direction.

Hitherto, as such a tire testing machine, there is known a tire testing machine including a rim member into which a bead portion of an inner periphery of a tire is fitted, a rotatable spindle to which the rim member is attached, a member that applies a predetermined internal pressure to the tire, and a road surface substituting member such as a drum which is pressed against an outer periphery of the tire. In the tire testing machine, the tire fitted into the rim member is rotationally driven by the rotation of the spindle, and the rotating tire contacts the road surface substituting member, thereby measuring the uniformity of the tire in the circumferential direction. In general, lubricant is applied to the bead portion of the tire to be tested so as to smoothly fit the tire into the rim member.

As such a tire testing machine, there is known a tire testing machine further including a loading device which feeds a tire to be tested to a testing station conveyor with the spindle and the like. The loading device includes a conveyor which conveys the tire, and feeds the tire to a position where the center of the tire matches the spindle. Further, as the loading device, there is known a loading device which includes a lubricator for applying lubricant to a bead portion of the inner periphery of the tire conveyed on the conveyor.

For example, Patent Document 1 discloses a tire testing machine including a tire testing station which includes a spindle provided vertically, a centering station which is provided at a position separated from the spindle by a predetermined distance and centers the tire to be tested, and a loading device which feeds the tire in a laid state from the centering station to the tire testing station so as to attach the tire to the spindle in a laid state. Alternatively, there is also known a tire testing machine in which a spindle is provided sideways and a tire is attached to the spindle in an upright state. The centering station of the tire testing machine disclosed in Patent Document 1 includes a unit which rotates the centered tire and an applicator which applies lubricant to a bead portion of the inner periphery of the rotating tire. The conveyor of the tire testing machine may feed the centered tire from the centering station to the center position of the spindle of the tire testing station by normally conveying the tire by a predetermined distance.

In the above-described loading device for the tire testing machine, it is an important issue to shorten the feeding time necessary for feeding the next tire staying at the standby position such as the centering station to the spindle attachment position after the test of the tire attached to the spindle ends. The shortening of the feeding time leads to the shortening of the testing cycle time. However, it is not desirable to excessively increase the conveying speed for the purpose of shortening the feeding time from the viewpoint of the design and the safety of the device.

CITATION LIST

Patent Document

Patent Document 1: JP 2007-279057 A

SUMMARY OF INVENTION

It is an object of the present invention to provide a loading device which is provided in a tire testing machine with a testing station having a spindle and shortens a time necessary for feeding a tire from a standby position before the testing station to the spindle attachment position without excessively increasing a tire conveying speed.

In order to achieve the object, the present inventors have been interested in the setting of the standby position for staying the tire before the testing station. In the existing loading device, since the standby position is set based on the center of the tire (specifically, the standby position of the tire to be tested is set as the position where the distance from the spindle provided in the testing station to the center of the tire to be tested matches a predetermined constant distance), the tire conveying distance from the standby position to the testing position, that is, the position where the tire is attached to the spindle is constant regardless of the diameter of the tire. On the contrary, since the standby position of the tire is set based on the front end (the end near the testing station) of the tire to be tested (specifically, the standby position of the tire is set as the position matching a specific position where the front end of the tire is separated from the spindle by a predetermined distance), it is possible to shorten the conveying distance with respect to the tire having a small diameter (the distance from the center of the tire at the standby position to the spindle). Accordingly, it is possible to shorten the feeding time at the testing station and the cycle time without increasing the conveying speed.

The present invention has been made from these viewpoints, and provides a loading device which is provided in a tire testing machine including a testing station provided with a spindle attached with a tire to be tested and feeds the tire to the testing station from a predetermined standby position to a testing position where the spindle matches the center of the tire. The loading device includes a conveyor which conveys the tire from the standby position toward the testing position in a direction perpendicular to the axial direction and a positioning device which positions the tire to a position, in which the front end of the tire to be tested in the feeding direction matches a point separated from the spindle by a predetermined distance, as the standby position.

BRIEF DESCRIPTION OF DRAWINGS

FIG. 1 is a plan view of a tire testing machine according to an embodiment of the present invention.

FIG. 2 is a cross-sectional view taken along the line II-II of FIG. 1.

[FIG. 3]

[FIG. 4] FIGS. 4(a) and 4(b) are plan views respectively illustrating a procedure in which a tire is conveyed by a belt conveyor of FIG. 1.

[FIG. 5] FIGS. 5(a) and 5(b) are plan views illustrating a procedure in which lubricant is applied to a bead portion of a tire on a conveyor of FIG. 1 by a lubricator.

FIG. 6 is a cross-sectional view taken along the line VI-VI of FIG. 5(b).

FIG. 7 is an enlarged cross-sectional view illustrating a brush of the lubricator of FIG. 6.

[FIG. 8] FIGS. 8(a) and 8(b) are plan views respectively illustrating a procedure in which a front end of a tire applied with lubricant is positioned.

FIG. 9 is a plan view illustrating a procedure in which the tire, of which the front end is positioned as illustrated in FIG. 8(b), is fed to a testing station.

FIG. 10 is a plan view illustrating a modified example of a rotation mechanism of an arm member of FIG. 1.

DESCRIPTION OF EMBODIMENTS

Figure 1:
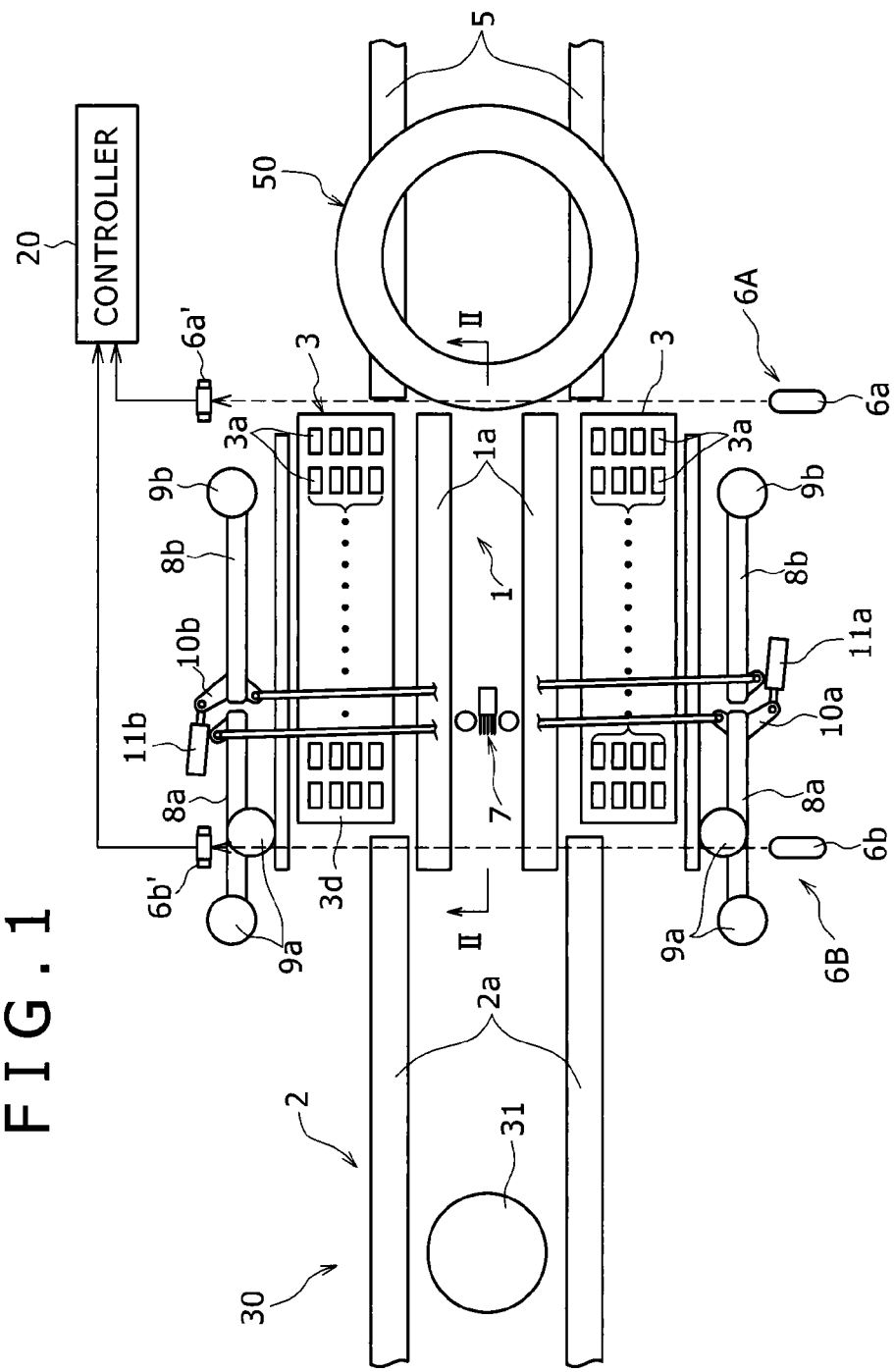
[FIG. 1]

Hereinafter, an embodiment of the present invention will be described by referring to the drawings.

Figure 2:
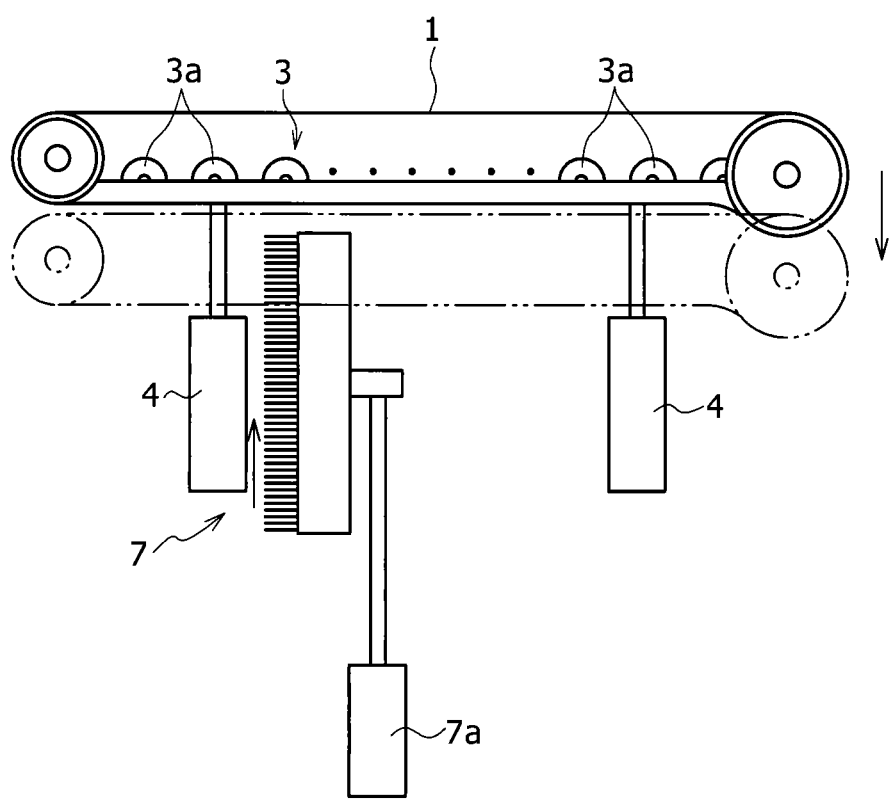
[FIG. 2]

FIGS. 1 and 2 illustrate a tire testing machine according to the embodiment of the present invention. The tire testing machine includes a testing station 30 which includes a spindle 31 extending in the up and down direction and to which a center portion of a tire 50 is attachable, a loading device which feeds the tire 50 from a predetermined standby position to a testing position corresponding to a matching position between the spindle 31 and the center of the tire 50 in the testing station 30, and a supply conveyor 5 which supplies the tire 50 to the loading device.

The loading device includes a conveyor which conveys the tire 50 in a laid state in the conveying direction (in this embodiment, the horizontal direction) perpendicular to the axial direction, a tire rotating machine which rotates the tire 50 in a laid state about the center axis thereof, a lubricator 7 which supplies lubricant to the rotating tire 50, and a controller 20 which is configured as a computer or the like, and the controller 20 constitutes a part of a positioning device which positions the tire 50 to the standby position.

The conveyor according to this embodiment includes a first belt conveyor 1 and a second belt conveyor 2.

The first belt conveyor 1 includes a pair of left and right conveyor belts 1a which is disposed in parallel to each other, and conveys the tire 50 placed thereon in a laid state toward the testing station 30. The second belt conveyor 2 also includes a pair of left and right conveyor belts 2a which is disposed in parallel to each other, and is connected to the downstream side of the first belt conveyor 1 so as to directly convey the tire 50 conveyed by the first belt conveyor 1 to the testing position. Specifically, both belt conveyors 1 and 2 are disposed so that the gap between the conveyor belts 2a of the second belt conveyor 2 is larger than the gap between the conveyor belts 1a of the first belt conveyor 1 and the upstream end of the conveyor belt 2a of the second belt conveyor 2 overlaps the downstream end of the conveyor belt 1a of the first belt conveyor 1 when viewed from the horizontal direction.

In the relation of the conveyors, the supply conveyor 5 is disposed at the upstream side of the first belt conveyor 1, and the spindle 31 of the testing station 30 is provided at a position between the conveyor belts 2a of the second belt conveyor 2.

The tire rotating machine includes a tire support member that supports the tire 50 so as to permit the rotation of the tire 50 in the laid state at the standby position or the vicinity position (in this embodiment, a slightly upstream position in relation to the standby position) and a rotation operation device which rotates the tire 50 supported by the tire support member. In this embodiment, a pair of roller portions 3 is provided as the tire support member.

As described above, the first belt conveyor 1 and the second belt conveyor 2 which respectively include a pair of conveyor belts partially include a conveying surface with respect to the width direction (the right and left direction) as the direction perpendicular to the conveying direction, and the respective roller portions 3 are respectively provided at the portions without the conveying surface of the first belt conveyor 1, that is, the outer portions of both conveyor belts 1a of the first belt conveyor 1 in the width direction.

Figure 3A:
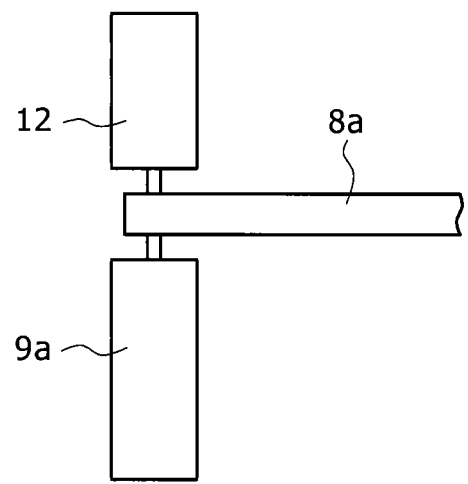
FIG. 3(a) is an enlarged front view illustrating one pressing roller of FIG. 1
Figure 3B:
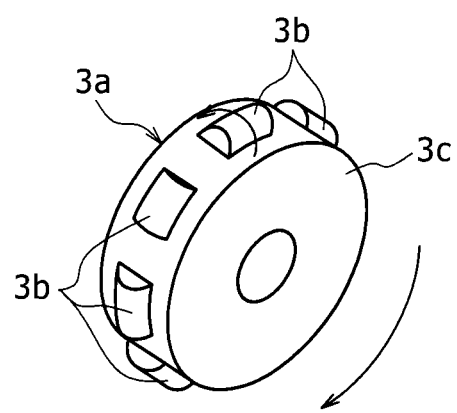
FIG. 3(b) is an enlarged perspective view illustrating a placement roller of FIG. 1.

Each roller portion 3 includes support rollers 3a which are plural rotation bodies arranged in parallel in the horizontal direction and a roller holding portion 3d which is a rotation body holding portion holding the support rollers 3a so as to be rotatable about its axis in the width direction. Each roller portion 3 supports the tire 50 loaded on plural support rollers 3a in a laid state while permitting the rotation thereof within the horizontal plane, and constitutes a placement surface on which the tire 50 is placed so as to be rotatable within the horizontal plane, that is, the support surface that rotatably supports the tire 50. Specifically, each support roller 3a includes a body roller 3c and plural roller members 3b illustrated in FIG. 3(b). The body roller 3c is held by the roller holding portion 3d so as to be rotatable about its axis in the width direction, and the respective roller members 3b are arranged on the outer peripheral surface so as to be rotatable about the axis in a direction parallel to the tangential line with respect to the outer peripheral surface of the body roller 3c. The combination of the rotation of the body roller 3c and the rotation of each roller member 3b permits the rotation of the tire 50 within the horizontal plane.

The respective roller portions 3 may be provided at the inside of the conveyor belt 1a of the first belt conveyor 1 or may be provided at both the inside and the outside of the conveyor belt 1a. Further, the tire support member may support the tire 50 so as to permit the rotation thereof. In addition, rotation bodies, for example, plural spherical bodies instead of the support rollers 3a may be arranged on a plane so as to be rotatable about an arbitrary axis and the tire may be supported by the rotation bodies.

The tire rotating machine further includes a height position changing device which changes a relative height position of the conveying surface and the placement surface between a state where the conveying surface of the first belt conveyor 1 is located above the placement surface of the roller portion 3, that is, the support surface supporting the tire 50 and a state where the conveying surface is located below the placement surface. In this embodiment, a cylinder 4 which moves in a telescopic manner so as to elevate the entire first belt conveyor 1 is provided as the height position changing device, and the telescopic driving of the cylinder 4 is controlled by the controller 20. The cylinder 4 moves up the first belt conveyor 1 so that the conveying surface of the first belt conveyor 1 is located above the placement surface of the roller portion 3 as indicated by the solid line of FIG. 2 when the first belt conveyor 1 conveys the tire 50 and moves down the first belt conveyor 1 so that the conveying surface is located below the placement surface as indicated by the two-dotted chain line of FIG. 2 when the tire 50 is rotated as described below.

The height position changing device may be used to elevate the roller portion 3 instead of the first belt conveyor 1. For example, even when the vertical position of the first belt conveyor 1 is fixed and the elevation cylinder is connected to the roller portion 3, the relative height position between the conveying surface of the first belt conveyor 1 and the placement surface of the roller portion 3 may be changed.

The positioning device according to this embodiment includes the controller 20, a first photoelectric sensor 6A, and a second photoelectric sensor 6B.

The first photoelectric sensor 6A is a rear end sensor which is disposed so as to detect the rear end of the tire 50 conveyed to the downstream side from the supply conveyor 5 toward the first belt conveyor 1. Specifically, the first photoelectric sensor 6A includes a light emitting element 6a and a light receiving element 6a', and both elements 6a and 6a' are disposed so that the light emitted from the light emitting element 6a crosses the immediately upstream position of the first belt conveyor 1 in the width direction and is received by the light receiving element 6a'. The light receiving element 6a' generates an electric signal by receiving the light and inputs the electric signal to the controller 20.

The second photoelectric sensor 6B is a front end sensor which is disposed so as to detect the front end of the tire 50 at a position near the downstream end of the first belt conveyor 1, that is, a predetermined position set as a region where the downstream end of the first belt conveyor 1 overlaps the upstream end of the second belt conveyor 2 in this embodiment. Specifically, the second photoelectric sensor 6B includes a light emitting element 6b and a light receiving element 6b', and both elements 6b and 6b' are disposed so that the light emitted from the light emitting element 6b crosses the predetermined position in the width direction and is received by the light receiving element 6b'. The light receiving element 6b' generates an electric signal by receiving the light and inputs the electric signal to the controller 20.

In the loading device, a position where the second photoelectric sensor 6B detects the front end of the tire 50 is set as the standby position of the tire 50. The controller 20 performs control which positions the tire 50 based on the electric signals (the position detection signals) input from both photoelectric sensors 6A and 6B. Specifically, the controller 20 performs control which stops the first belt conveyor 1 at a time point when the tire 50 conveyed by the first belt conveyor 1 reaches the standby position and operates the first belt conveyor and the second belt conveyor 2 at a time point when the test of the tire 50 is completed in the testing station 30 at the previous stage. The second belt conveyor 2 feeds the tire 50 received from the first belt conveyor 1 to the testing position where the center of the tire 50 matches the rotation center position of the spindle 31 provided in the testing station 30 in the longitudinal direction. The controller 20 stops both belt conveyors 1 and 2 at a time point when the feeding operation is completed. As will be described later, the positioning operation at the testing position may be attained by the controller 20 including an outer diameter calculating unit which calculates the outer diameter of the tire 50, a feeding distance calculating unit which calculates a feeding distance as a distance in which the tire 50 is fed from the standby position toward the testing position based on the outer diameter of the tire 50, and a conveying controller which operates the conveyors (the first and second belt conveyors 1 and 2) which feed the tire 50 from the standby position toward the testing position by the calculated feeding distance. Alternatively, the positioning operation may be attained in a manner such that the front end position of the tire 50 is detected by, for example, a photoelectric sensor (not illustrated) when the feeding operation is completed and the front end position is recognized by the controller 20.

Figure 6:
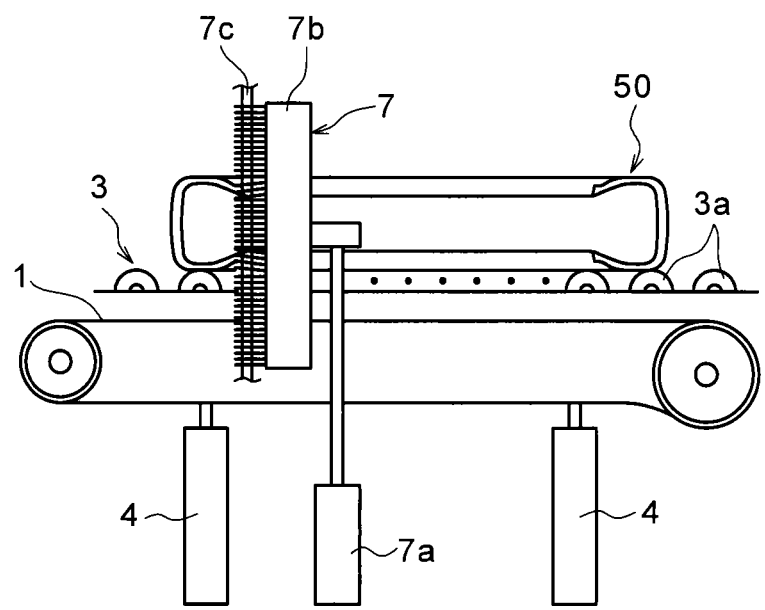
[FIG. 6]
Figure 7:
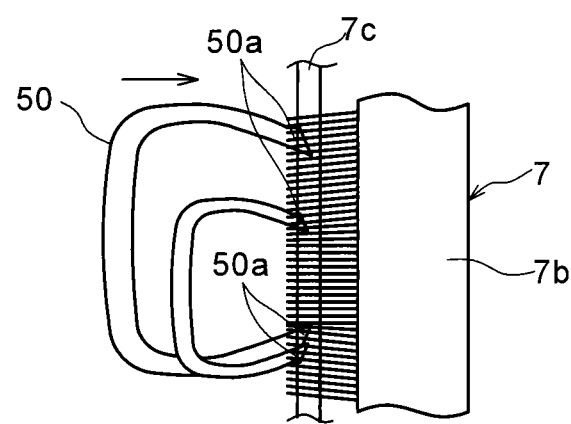
[FIG. 7]

The lubricator 7 is used to apply lubricant to a bead portion 50a of the inner periphery of the tire 50 illustrated in FIG. 7, and is disposed between the conveyor belts 1a of the first belt conveyor 1. The lubricator 7 includes a brush 7b which applies lubricant to the bead portion 50a and a pair of positioning rollers 7c (see FIGS. 5 to 7) which abuts against the inner periphery of the tire 50 for the positioning operation. The lubricator 7 according to this embodiment is connected with a cylinder 7a which moves in a telescopic manner in the up and down direction and the lubricator 7 moves up and down by the telescopic movement of the cylinder 7a.

The rotation operation device is used to rotate the tire 50 placed on the roller portion 3 in a laid state, and includes a pair of first arm members 8a, a pair of second arm members 8b, a plurality of tire holding rollers 9a, a plurality of tire holding rollers 9b, a first arm member operation mechanism, a second arm member operation mechanism, and a motor 12 which rotationally drives the specific tire holding rollers 9a.

The respective first arm members 8a are provided at both outer sides in the width direction of the downstream portion of the first belt conveyor 1, each first arm member includes a base end which is located at the upstream side in the conveying direction and serves as a support point rotatable about the perpendicular axis and an opposite rotatable end, that is, a front end which is located at the downstream side in the conveying direction, and the tire holding roller 9a is attached to each of the front end and the middle portion slightly closer to the base end so as to be rotatable about the perpendicular axis. The respective second arm members 8b are provided at the upstream positions very near the first arm members 8a in the conveying direction, each second arm member includes an end which is located at the downstream side in the conveying direction and serves as a support point rotatable about the perpendicular axis and an opposite rotatable front end, that is, the upstream end in the conveying direction, and the tire holding roller 9b is attached to the front end so as to be rotatable about the perpendicular axis.

Figure 10:
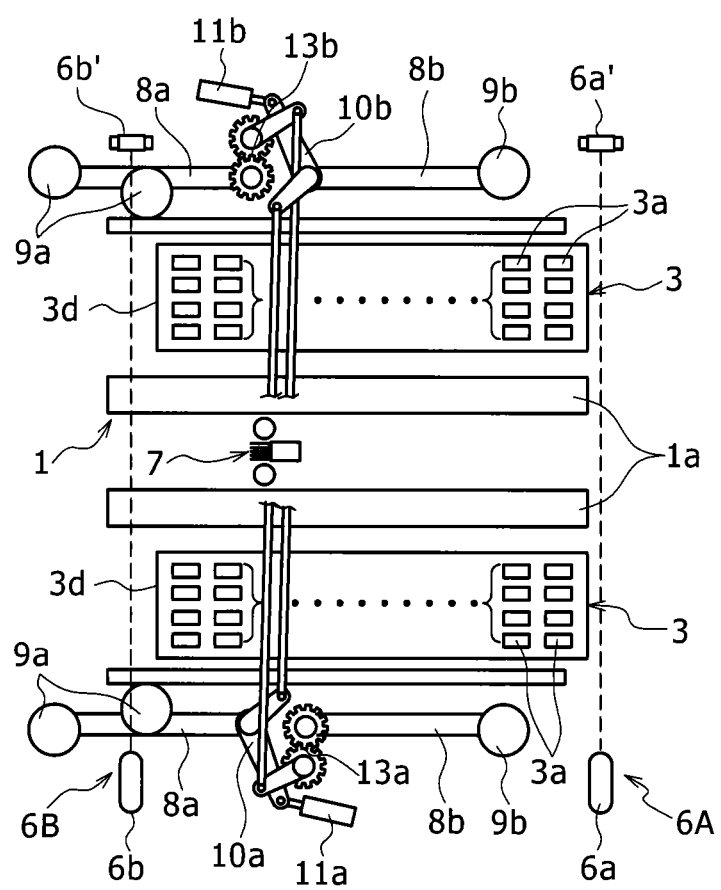
[FIG. 10]

The first arm member operation mechanism is used to simultaneously rotate both first arm members 8a so as to be bilaterally symmetric to each other in the inner and outer direction, and includes a link mechanism 10a which is connected to both first arm members 8a so as to move the first arm members 8a in an interlocked state and an air cylinder 11a which moves the link mechanism 10a so as to rotate both first arm members 8a. Similarly, the second arm member operation mechanism is used to simultaneously rotate both second arm members 8b so as to be bilaterally symmetric to each other in the inner and outer direction, and includes a link mechanism 10b which is connected to both second arm members 8b so as to move the second arm members 8b in an interlocked manner and an air cylinder 11b which moves the link mechanism 10b so as to rotate both second arm members 8b. The first and second arm operation mechanisms may be configured by the combination of the link mechanisms 10a and 10b and the gear mechanisms 13a and 13b as in the modified example illustrated in FIG. 10.

The respective tire holding rollers 9a and 9b are pressed against the outer peripheral surface of the tire 50 toward the center thereof by the inward rotations of the respective arm members 8a and 8b, so that the tire 50 is rotatably restrained from the outside. The motor 12 is connected to the pressing roller 9a attached to the front end of one first arm member 8a of the tire holding rollers 9a and 9b, and rotationally drives the tire holding roller 9a so as to rotate the tire 50 against which the tire holding rollers 9a are pressed.

That is, the first and second arm members 8a and 8b hold a plurality of tire holding rollers 9a and 9b so as to be rotatable about the axes parallel to the tire center axis, and constitute a roller support member that is operable between a position where the tire holding rollers 9a and 9b are pressed against the outer peripheral surface of the tire 50 and a position where the tire holding rollers are separated from the outer peripheral surface.

Next, an operation will be described in which the conveying device feeds the tire 50 supplied from the supply conveyor 5 to the testing station 30.

When the supply conveyor 5 and the first belt conveyor 1 are driven while the conveying surface of the first belt conveyor 1 is located above the placement surface of the roller portion 3, the tire 50 is supplied from the supply conveyor 5 onto the first belt conveyor 1. Then, as illustrated in FIG. 4(*a*), the controller 20 changes the conveying speed of the first belt conveyor 1 to a comparatively constant low-speed conveying speed V at a time point when the rear end of the tire 50 is detected by the first photoelectric sensor 6A, that is, a time point when the light is received by the light receiving element 6*a*' after the tire 50 interrupts the light from the light emitting element 6*a* of the first photoelectric sensor 6A to the light receiving element 6*a*'. Further, as illustrated in FIG. 4(*b*), the controller 20 first stops the first belt conveyor 1 at a time point when the downstream second photoelectric sensor 6B detects the front end of the tire 50, that is, a time point when the tire 50 starts to interrupt the light from the light emitting element 6*b* of the second photoelectric sensor 6B to the light receiving element 6*b*'. Accordingly, the tire 50 is positioned to the standby position before the testing station 30, and stays at the standby position until the test of the tire at the previous stage ends (except for the lubricant applying period to be described later).

The controller 20 includes the outer diameter calculating unit which calculates the dimension of the outer diameter D of the tire 50 based on the detection timing of both photoelectric sensors 6A and 6B. First, the conveying distance ΔL from the detection timing when the first photoelectric sensor 6A detects the rear end of the tire 50 to the detection timing when the second photoelectric sensor 6B detects the front end of the tire 50 and the first belt conveyor 1 is stopped is calculated by Equation (1) from the time T1 when the photoelectric sensor 6A detects the rear end of the tire 50, the time T2 when the photoelectric sensor 6B detects the front end of the tire 50, and the conveying speed V of the first belt conveyor 1.

$$\Delta L = (T2 - T1) \times V \quad (1)$$

Accordingly, as illustrated in FIG. 4(*a*), the outer diameter D of the tire 50 may be calculated from Equation (2) by using the distance L1 between the position where the first photoelectric sensor 6A detects the rear end of the tire 50 and the position where the second photoelectric sensor 6B detects the front end of the tire 50 and the conveying distance ΔL obtained from Equation (1).

$$D = L1 - \Delta L \quad (2)$$

The conveying distance ΔL may be also calculated from, for example, the relation between the number of pulses output from an encoder attached to the conveyor motor for driving the first belt conveyor 1 and the belt movement distance of the first belt conveyor 1 for each pulse. Specifically, the conveying distance may be obtained by a method of counting the number of pulses until the downstream photoelectric sensor 6B detects the front end of the tire 50 after the upstream photoelectric sensor 6A detects the rear end of the tire 50 and multiplying the counted number of pulses by the movement distance for each pulse.

After the first belt conveyor 1 is stopped, the air cylinder 7*a* is operated to move up the lubricator 7 so that the lubricator 7 protrudes upward from the roller portion 3. Meanwhile, the controller 20 operates the cylinder 4 to move down the conveying surface of the first belt conveyor 1 to a position below the placement surface of the roller portion 3 so that the tire 50 is transferred to the placement surface. Specifically, the conveying surface of the first belt conveyor 1 is moved down so that the conveying surface is located below the upper end of each support roller 3*a* of the roller portion 3, that is, the upper end of the uppermost roller member 3*b*, and the tire is transferred from the conveying surface onto the roller member 3*b* of each support roller 3*a* as the placement surface.

Further, as illustrated in FIG. 5(*a*), the controller 20 rotates the first arm member 8*a* inward in the width direction so that the pressing roller 9*a* is pressed against the outer peripheral surface of the tire 50 placed on the roller portion 3 and the tire 50 is pressed back toward the upstream side. In this way, as illustrated in FIG. 5(*b*), the tire 50 is pressed back to a position where the positioning roller 7*c* of the lubricator 7 moved up as described above abuts against the inner periphery of the tire, and the controller 20 rotates the second arm member 8*b* inward in the width direction so that the respective pressing rollers 9*a* and 9*b* of the first and second arm members 8*a* and 8*b* are pressed against the outer peripheral surface of the tire 50 toward the center thereof. In this state, the motor 12 is operated so as to rotationally drive the pressing roller 9*a* attached to the front end of one first arm member 8*a*. Thus, as illustrated in FIGS. 6 and 7, the tire 50 on the roller portions 3 rotates within the horizontal plane, so that the brush 7*b* of the lubricator 7 may apply lubricant to the bead portion 50*a* of the tire 50 throughout the entire periphery thereof.

After the application is completed, as illustrated in FIG. 8(*a*), the controller 20 rotates the first arm member 8*a* and the second arm member 8*b* in the outward direction, that is, the opening direction and operates the cylinder 4 to move up the conveying surface of the first belt conveyor 1 to a position above the placement surface of the roller portion 3 so that the tire 50 is transferred onto the first belt conveyor 1 again. Then, the controller 20 operates the first belt conveyor 1 again to move the tire 50 toward the downstream side again, and operates the air cylinder 7*a* in the meantime to return the lubricator 7 applied with lubricant to the standby position below the roller portion 3. Then, as illustrated in FIG. 8(*b*), the first belt conveyor 1 is stopped after the tire 50 is moved to a position where the second photoelectric sensor 6B detects the front end of the tire 50. By the above-described operation, the tire 50 is positioned in the width direction and is positioned at a predetermined position where the front end of the tire 50 is detected by the second photoelectric sensor 6B, that is, the standby position regardless of the outer diameter.

Figure 9:
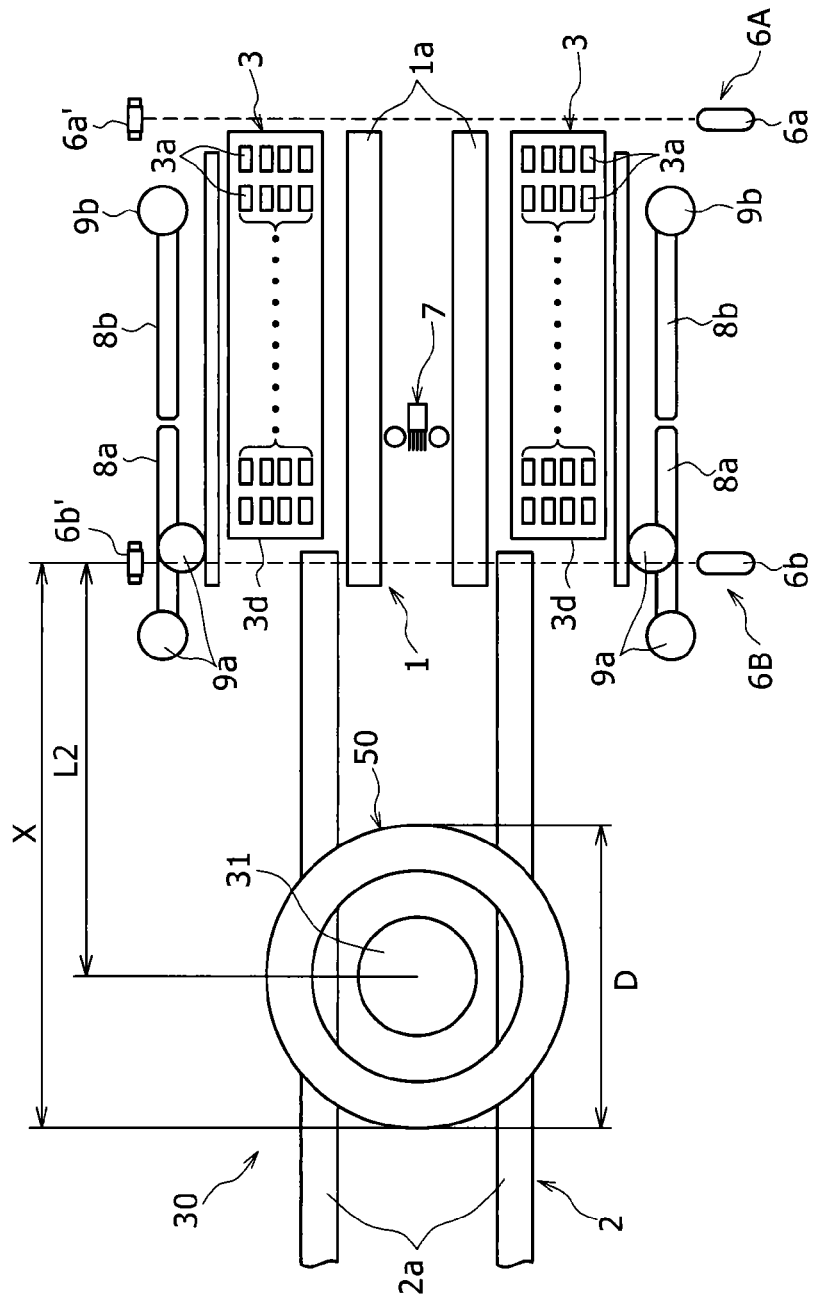
[FIG. 9]

The tire 50 which is positioned in this way stays at the standby position until the test of the tire 50 at the testing station 30 in the previous stage is completed. After the test of the tire 50 in the previous stage is completed, as illustrated in FIG. 9, the controller 20 operates the first and second belt conveyors 1 and 2 again to feed the tire 50 to the testing position where the center of the tire matches the rotation center position of the spindle 31 of the testing station 30. As will be described later, the feeding operation is performed by the feeding distance X calculated based on the tire outer diameter D, so that the tire 50 is automatically positioned at the testing position. The tire 50 which is fed in this way is sideways attached to the spindle 31 so that the bead portion 50*a* is fitted to a rim member (not illustrated). That is, the controller 20 according to this embodiment includes the feeding distance calculating unit which calculates a feeding distance in which the tire 50 is fed from the standby position toward the testing position based on the outer diameter D of the tire 50 calculated by the outer diameter calculating unit and the conveying controller which operates the conveyor so that the tire is fed from the standby position toward the testing station by the feeding distance.

As described above, the operation of setting and positioning the tire 50 at the standby position based on the front end of the tire 50 may shorten the feeding distance X of the tire 50 from the standby position to the testing position, that is, the position where the rotation center of the tire 50 matches the rotation center position of the spindle 31. Specifically, when the distance from the detection position of the predetermined downstream photoelectric sensor 6B to the rotation center position of the spindle 31 in the conveying direction, that is, the distance from the standby position where the front end of the tire 50 is positioned in the first belt conveyor 1 to the rotation center position of the spindle 31 in the conveying direction is denoted by L2, the feeding distance X is determined by Equation (3) based on the distance L2 and the outer diameter D of the tire 50 obtained by Equation (2).

$$X = L2 + D/2 \tag{3}$$

As understood from Equation (3), in the loading device for a tire testing machine according to the present invention, the feeding distance X of the tire 50 from the standby position to the testing position, that is, the position where the center of the tire 50 matches the rotation center position of the spindle 31 of the testing station 30 becomes shorter as the outer diameter D of the tire 50 becomes smaller. Accordingly, it is possible to shorten the feeding time necessary for feeding the tire 50 from the standby position to the testing position as much as possible compared to the existing loading device in which the feeding distance is constant regardless of the outer diameter of the tire 50. Thus, it is possible to shorten the testing cycle time and hence to improve the test efficiency.

The present invention is not limited to the above-described embodiment, and may include various forms without departing from the spirit thereof.

For example, the sensor constituting the positioning device, that is, the sensor for detecting the front end of the tire to determine the standby position is not limited to the above-described photoelectric sensor, and may be another non-contact type sensor or a contact type sensor. Further, the first photoelectric sensor 6A of the first and second photoelectric sensors 6A and 6B is not essentially needed for the present invention.

There is no need to essentially measure the outer diameter D of the tire 50. For example, the data of the outer diameter D of the tire 50 may be used by transmitting the data from the upper-level computer to the loading device for a tire testing machine. The transmitted data may not be a value of the outer diameter D. For example, a configuration may be employed in which the loading device for a tire testing machine stores a value of the outer diameter D corresponding to the identification number of the tire, the identification number of the tire is transmitted to the loading device for a tire testing machine, and the loading device selects the outer diameter D corresponding to the identification number.

The conveyor according to the present invention is not limited to the above-described plural belt conveyors (the first and second belt conveyors 1 and 2), and may be a single continuous belt conveyor. Alternatively, another conveyor other than the belt conveyor may be used.

In the tire testing machine according to the above-described embodiment, the tire 50 is attached to the spindle 31 in a laid state and the loading device feeds the tire 50 to the spindle 31 in a laid posture. However, the loading device for a tire testing machine according to the present invention may be provided in the tire testing machine in which the tire is vertically attached to the spindle and may feed the tire in the vertical direction.

As described above, according to the present invention, there is provided a loading device for a tire testing machine that is provided in a tire testing machine including a testing station provided with a spindle attached with a tire to be tested and feeds the tire from a predetermined standby position to a testing position where the center of the spindle matches the center of the tire in the testing station, the loading device for a tire testing machine including: a conveyor that conveys the tire from the standby position toward the testing position in a direction perpendicular to the axial direction; and a positioning device that positions the tire to a position, in which a front end of the tire to be tested in the feeding direction matches a point separated from the spindle by a predetermined distance, as the standby position. In the loading device, since the standby position of the tire is set with reference to the position of the front end of the tire to be tested in the feeding direction and the positioning device positions each tire to the standby position, the tire feeding distance and the tire feeding time from the standby position to the testing position are shortened as the outer diameter of the tire becomes smaller. Accordingly, it is possible to shorten the testing cycle time.

For example, the positioning device may include a front end sensor that is provided at a specific position before the testing station so as to detect the arrival of the front end of the tire and a controller that controls an operation of the conveyor, and the controller may operate the conveyor until the sensor detects the front end of the tire and may stop the tire at the standby position based on a time point when the sensor detects the front end of the tire.

The loading device may further include a tire rotating machine that rotates the tire about its axis at the standby position or the vicinity thereof; and a lubricator that supplies lubricant to a bead portion of the inner periphery of the rotating tire. The combination of the tire rotating machine and the lubricator may enable the appropriate and efficient lubricant application with respect to the bead portion of the tire to be tested in the entire circumference thereof.

The tire rotating machine may include a tire support member that includes a placement surface for placing the tire in a laid state thereon and supports the tire on the placement surface so as to permit the rotation of the tire and a rotation operation device that holds the tire supported by the tire support member and rotates the tire on the placement surface. The tire rotating machine may stably rotate the tire on the horizontal plane while supporting the tire in a laid posture.

In this case, the conveyor may include a belt conveyor that partially includes a conveying surface in the width direction as a direction perpendicular to the conveying direction in which the tire is conveyed, the tire support member may be provided in a region without the conveying surface of the belt conveyor in the width direction, and the tire rotating machine may further include a height position changing device that changes a relative height position between the conveying surface and the placement surface so as to be switched between a state where the conveying surface of the belt conveyor is located above the placement surface of the tire support member and a state where the conveying surface is located below the placement surface. The height position changing device may enable both the tire conveying operation by the belt conveyor and the tire rotating operation by the supporting of the tire support member while efficiently using the region without the conveying surface of the belt conveyor.

Further, the tire support member may include plural rotation bodies that are arranged on a horizontal plane and a rotation body holding portion that holds the rotation bodies, and the rotation body holding portion may hold the rotation bodies such that the respective rotation bodies rotate so as to permit the rotation of the tire while the tire is placed on the rotation bodies.

Meanwhile, the rotation operation device may include plural tire holding rollers, a roller support member that holds the tire holding rollers so as to be rotatable about the axes parallel to a tire center axis and is operable between a position where the tire holding rollers are pressed against the outer peripheral surface of the tire and a position where the tire holding rollers are separated from the outer peripheral surface, and a motor that rotates the tire by rotating a specific tire holding roller among the tire holding rollers while the respective tire holding rollers are pressed against the outer peripheral surface of the tire. The rotation operation device enables the rotation of the tire without attaching the tire to the rotation operation device. Further, tires having different outer diameters may be rotated by the common rotation operation device.

More specifically, the roller support member may include a pair of arm members that is rotatable so as to be bilaterally symmetric to each other in the width direction perpendicular to the conveying direction of the conveyor, and the tire holding rollers may be attached to rotatable portions of the arm members. These arm members may stably sandwich the tire from both sides in the width direction.

In the present invention, in a case where the positioning device includes the front end sensor and the controller. The loading device may further include a rear end sensor that is provided at the upstream position in relation to the standby position so as to detect a rear end of the tire conveyed in the conveying direction; and an outer diameter calculating unit that calculates an outer diameter of the tire based on a tire conveying distance in which the conveyor conveys the tire from a detection position where the rear end sensor detects the rear end of the tire to a detection position where the front end sensor detects the front end of the tire and a distance from the detection position where the rear end sensor detects the rear end of the tire to the detection position where the front end sensor detects the front end of the tire. The outer diameter calculating unit may easily obtain the outer diameter of the tire by using the detection of the tire using both sensors.

Here, for example, the outer diameter calculating unit may calculate the tire conveying distance from a conveyor conveying speed and a tire conveying time from a detection time when the rear end sensor detects the rear end of the tire to a detection time when the front end sensor detects the front end of the tire.

Further, in the present invention, the loading device may further include a feeding distance calculating unit that calculates a feeding distance as a distance in which the tire positioned to the standby position is fed toward the testing position based on an outer diameter of the tire and a distance from the standby position to a center position of the spindle and a conveying controller that operates the conveyor so as to feed the tire from the standby position toward the testing station by the feeding distance. Accordingly, it is possible to highly precisely feed the tire having a different outer diameter to the center position of the spindle of the testing station without using the sensor for detecting the arrival of the tire with respect to the testing position. As the outer diameter of the tire, for example, a value which is calculated by the outer diameter calculating unit may be used.

The invention claimed is:

1. A loading device for a tire testing machine that is provided in a tire testing machine including a testing station provided with a spindle attached with a tire to be tested and feeds the tire from a predetermined standby position to a testing position where the center of the spindle matches the center of the tire in the testing station, the loading device for a tire testing machine comprising:
    a conveyor that conveys the tire from the standby position toward the testing position in a direction perpendicular to the axial direction; and
    a positioning device that positions the tire to a position, in which a front end of the tire to be tested in the feeding direction matches a point separated from the spindle by a predetermined distance, as the standby position.

2. The loading device for a tire testing machine according to claim 1,
    wherein the positioning device includes a front end sensor that is provided at a specific position before the testing station so as to detect the arrival of the front end of the tire and a controller that controls an operation of the conveyor, and
    wherein the controller operates the conveyor until the sensor detects the front end of the tire and stops the tire at the standby position based on a time point when the sensor detects the front end of the tire.

3. The loading device for a tire testing machine according to claim 1, further comprising:
    a tire rotating machine that rotates the tire about its axis at the standby position or the vicinity thereof; and
    a lubricator that supplies lubricant to a bead portion of the inner periphery of the rotating tire.

4. The loading device for a tire testing machine according to claim 3,
    wherein the tire rotating machine includes a tire support member that includes a placement surface for placing the tire in a laid state thereon and supports the tire on the placement surface so as to permit the rotation of the tire and a rotation operation device that holds the tire supported by the tire support member and rotates the tire on the placement surface.

5. The loading device for a tire testing machine according to claim 4,
    wherein the conveyor includes a belt conveyor that partially includes a conveying surface in the width direction as a direction perpendicular to the conveying direction in which the tire is conveyed, the tire support member is provided in a region without the conveying surface of the belt conveyor in the width direction, and the tire rotating machine further includes a height position changing device that changes a relative height position between the conveying surface and the placement surface so as to be switched between a state where the conveying surface of the belt conveyor is located above the placement surface of the tire support member and a state where the conveying surface is located below the placement surface.

6. The loading device for a tire testing machine according to claim 4,
    wherein the tire support member includes plural rotation bodies that are arranged on a horizontal plane and a rotation body holding portion that holds the rotation bodies, and the rotation body holding portion holds the rotation bodies such that the respective rotation bodies rotate so as to permit the rotation of the tire while the tire is placed on the rotation bodies.

7. The loading device for a tire testing machine according to claim 4,
    wherein the rotation operation device includes plural tire holding rollers, a roller support member that holds the tire holding rollers so as to be rotatable about the axes parallel to a tire center axis and is operable between a position where the tire holding rollers are pressed against the outer peripheral surface of the tire and a position where the tire holding rollers are separated from the outer peripheral surface, and a motor that rotates the tire by rotating a specific tire holding roller among the tire holding rollers while the respective tire holding rollers are pressed against the outer peripheral surface of the tire.

8. The loading device for a tire testing machine according to claim 7,
wherein the roller support member includes a pair of arm members that is rotatable so as to be bilaterally symmetric to each other in the width direction perpendicular to the conveying direction of the conveyor, and the tire holding rollers are attached to rotatable portions of the arm members.

9. The loading device for a tire testing machine according to claim 2, further comprising:
a rear end sensor that is provided at the upstream position in relation to the standby position so as to detect a rear end of the tire conveyed in the conveying direction; and
an outer diameter calculating unit that calculates an outer diameter of the tire based on a tire conveying distance in which the conveyor conveys the tire from a detection position where the rear end sensor detects the rear end of the tire to a detection position where the front end sensor detects the front end of the tire and a distance from the detection position where the rear end sensor detects the rear end of the tire to the detection position where the front end sensor detects the front end of the tire.

10. The loading device for a tire testing machine according to claim 9,
wherein the outer diameter calculating unit calculates the tire conveying distance from a conveyor conveying speed and a tire conveying time from a detection time when the rear end sensor detects the rear end of the tire to a detection time when the front end sensor detects the front end of the tire.

11. The loading device for a tire testing machine according to claim 2, further comprising:
a feeding distance calculating unit that calculates a feeding distance as a distance in which the tire positioned to the standby position is fed toward the testing position based on an outer diameter of the tire and a distance from the standby position to a center position of the spindle and a conveying controller that operates the conveyor so as to feed the tire from the standby position toward the testing station by the feeding distance.

* * * * *